3,515,509
PROCESS FOR EXTRACTING AND
CONCENTRATING EUROPIUM
Paul Rombau, Guillaumat, France, assignor to Produits
Chimiques Pechiney-Saint-Gobain, Neuilly-sur-Seine,
France
No Drawing. Filed Jan. 16, 1967, Ser. No. 609,296
Claims priority, application France, Jan. 31, 1966,
47,789
Int. Cl. C22b 59/00
U.S. Cl. 23—22                                9 Claims

ABSTRACT OF THE DISCLOSURE

The process of extracting europium from others of the rare earth metals comprises reacting the mixture containing the europium in the normal trivalent state with bivalent samarium in the presence of sulphuric acid to reduce the triavlent europium to bivalent europium sulfate.

---

This invention relates to a process for extracting europium from mixtures of rare earth metals and to the concentration of same.

It is known that different rare earths, when in a sufficiently pure state, can have very specific applications in numerous fields. However, the separation of rare earth metals is difficult. Different methods have been proposed ranging from the more efficient but too slow method of fractionated crystallization to the more recent methods of solvent extraction.

Some of the rare earth metals, by reason of their possibilities to convert to valences differing from the trivalent form, can be separated and concentrated by reason of the differences in their chemical behavior. Concerning rare earth metals capable of acquiring a bivalent state, such as europium and samarium, numerous methods for chemical separation have been proposed based upon the properties of the bivalent salt, properties which are related to the similar derivatives of alkaline earth metals.

Of these two rare earth metals, europium has become particularly important, when obtained in a relatively pure state, because of its outstanding ability to capture neutrons. This makes it particularly useful as a regulator for nuclear reactors. It is also useful as an adjunct to crystal lattices of different compounds because of its property to give luminescent substances which are utilizable, as in television. Meanwhile, the generally low content of europium in the rare earth ores and the relatively low concentration compared to samarium renders the methods of separation and concentration impractical from an industrial standpoint.

It is an object of this invention to provide a method for the separation and concentration of europium from its ores or from mixtures of rare earth metals containing europium and samarium and it is a related object to produce and to provide a method for producing europium sulfate.

This invention is addressed to a new and efficient process for extracting and concentrating europium from a mixture of rare earths in the form of trivalent metal salts.

The process of this invention consists in submitting the trivalent rare earth metal salts, in the presence of sulphuric acid, to the action of samarium in a bivalent state in an amount corresponding to the quantity of europium to be extracted based upon the atomic weights and in which the reaction is carried out in the presence of precipitation carriers selected of an alkaline earth metal. A mixture of insoluble sulfates of bivalent metals, which includes europium sulfate, separates out and europium is recuperated by various known means therefrom.

The present invention includes also the use of this europium sulfate as a raw material in the fabrication of luminescent substances and devices for capturing neutrons.

The process of this invention is based on the relative stabilites of europium and samarium in their bivalent state. Samarium is less stable in the bivalent state than europium and therefore can lead europium from its normal trivalent state to the bivalent state. Since europium and samarium are only slightly stable in their bivalent states, many precautions should be taken for the method of operation in order to control the passage of europium from the trivalent state to the bivalent state, as a sulfate, with the concurrent conversion of samarium from the bivalent to the trivalent state and while also avoiding the spontaneous oxidation of the bivalent samarium to the trivalent state before it is able to act in the manner desired on the trivalent europium salts. It is impossible industrially entirely to avoid this drawback even with the best precautions. As a result, it is desirable to make use of an excess amount of bivalent samarium in the process. Since the europium sulfate is slightly soluble, the presence of alkali earth carrier is somewhat indispensable for effecting substantially complete precipitation. As such carrier, it is preferred to make use of barium compounds. Preferably, the salts of the carrier metals are added and intimately mixed with the bivalent salt of samarium which is used to react with the trivalent europium salt.

Various methods may be used to prepare the bivalent samarium salts from trivalent samarium salts. Given the low stability in solution of the bivalent salts of samarium, it is preferred to obtain them by reduction of the corresponding samarium salts at relatively high temperature by means of such reducing metals as sodium and calcium. It then becomes possible to obtain molten masses to which the desired salts of the carrier metal can be added for precipitation.

The following example is given by way of illustration, but not by way of limitation, of the invention:

EXAMPLE

A mixture of 27 kg. rare earth chlorides in which samarium represents approximately half of the metals present and 27 kg. of calcium chloride and 27 kg. of barium chloride are melted in a furnace at a temperature of about 750° C. To this molten mixture addition is made of 2.5 kg. of calcium. After reaction and cooling, the mass is crushed and stamped. A chloride mixture is obtained in which the samarium present is converted to the bivalent state.

2500 liters of an acid solution is prepared with the following composition:

1 g./l. of rare earths containing 1% of $Eu_2O_3$
50 g./l. of $SO_4^{--}$
36 g./l. of $Cl^-$ to which are added 20 liters of acetic acid and an amount of ammonia liquor sufficient to reduce the pH to 4. It is preferred to work in ammonium acetate medium in order more easily to maintain the desirable pH.

The crushed chloride is added, with agitation, to this solution maintained at a temperature of 15–20° C. and the pH is adjusted towards a pH of 4 with 1 M sulphuric acid. A precipitate of metal sulfate in a bivalent state is obtained comprising barium, calcium and part of the samarium in excess and practically all of the europium present in the treated rare earth salt. The separated precipitate is then treated with nitric acid to solubilize all of the rare earths in the trivalent state and it is then recuperated by precipitation with oxalic acid in the conventional manner. The europium is then separated from samarium by well known means.

The preceding example is not a limitation on the present invention, particularly with respect to any working details. While solution of the rare earth salts to be treated can be carried out in sulphuric acid alone, the presence of chloride ions enable use of more concentrated liquors. It is also possible to fractionate the crushed mass containing bivalent samarium without departing from the spirit of the invention and to regulate the pH at each addition. The masses containing bivalent samarium can be of widely varying compositions dependent somewhat upon the manner in which they have been obtained by reduction. Thus it is possible to reduce rare earth metal chlorides containing samarium with sodium vapor and thereby obtain masses containing samarium in a bivalent state in accordance with one concept of the present invention.

I claim:

1. A process for the extraction and concentration of europium present in a mixture of trivalent rare earth salts comprising the steps of reacting the rare earth salts with bivalent samarium in the presence of sulphuric acid and an alkaline earth metal to precipitate insoluble bivalent metal sulfates that are formed including europium sulfate, separating the precipitate and recovering europium from the separated precipitate.

2. The process as claimed in claim 1 in which the amount of samarium introduced in the bivalent state is at least equal to the amount of europium to be extracted based upon the atomic equivalence.

3. The process as claimed in claim 2 in which the bivalent samarium is present in an amount in excess of the equivalent weight of the europium calculated to be extracted.

4. The process as claimed in claim 1 in which the bivalent samarium employed as a reactant is prepared by reduction of trivalent samarium chloride.

5. The process as claimed in claim 4 in which calcium is employed as a reducing agent for the trivalent samarium chloride.

6. The process as claimed in claim 4 in which sodium vapor is employed as the reducing agent for the trivalent samarium chloride.

7. The process as claimed in claim 1 which includes the step of maintaining the pH of the reaction at about 4.

8. The process as claimed in claim 7 in which the pH is adjusted with ammonium acetate.

9. The process as claimed in claim 1 in which the alkaline earth metal precipitate is barium.

References Cited

UNITED STATES PATENTS

| | | | |
|---|---|---|---|
| 3,077,378 | 2/1963 | Peppard et al. | 23—23 |
| 3,092,449 | 6/1963 | Bril et al. | 23—22 |
| 3,153,571 | 10/1964 | Bronaugh | 23—22 |

OTHER REFERENCES

Spedding et al., "The Rare Earths," John Wiley & Sons, New York, 1961, p. 23.

Topp, "The Chemistry of the Rare Earth Elements," Elsevier Publishing Co., New York, 1965, pp. 26–28.

HERBERT T. CARTER, Primary Examiner

U.S. Cl. X.R.

23—23, 117